US012657123B2

(12) United States Patent
Sharma et al.

(10) Patent No.: US 12,657,123 B2
(45) Date of Patent: Jun. 16, 2026

(54) ALLOCATING DATA STORAGE DEVICE RESOURCES BASED ON DETERMINED CAPABILITIES OF A HOST DEVICE

(71) Applicant: Sandisk Technologies, Inc., Milpitas, CA (US)

(72) Inventors: Amit Sharma, Karnataka (IN); Abhinandan Venugopal, Karnataka (IN); Hitesh Golechhha, Karnataka (IN)

(73) Assignee: Sandisk Technologies, Inc., Milpitas, CA (US)

(*) Notice: Subject to any disclaimer, the term of this patent is extended or adjusted under 35 U.S.C. 154(b) by 128 days.

(21) Appl. No.: 18/583,061

(22) Filed: Feb. 21, 2024

(65) Prior Publication Data

US 2025/0265186 A1      Aug. 21, 2025

(51) Int. Cl.
*G06F 12/02*          (2006.01)

(52) U.S. Cl.
CPC ................................ *G06F 12/0246* (2013.01)

(58) Field of Classification Search
CPC .................................................. G06F 12/0246
See application file for complete search history.

(56) References Cited

U.S. PATENT DOCUMENTS

| | | | |
|---|---|---|---|
| 9,239,757 B2 | 1/2016 | Yan et al. | |
| 9,880,760 B2 | 1/2018 | Inbar et al. | |
| 10,592,122 B2 | 3/2020 | Manohar et al. | |
| 2016/0124668 A1* | 5/2016 | Inbar ........................ | G06F 3/065 |
| | | | 711/162 |
| 2021/0157385 A1* | 5/2021 | Kwon .................... | G06F 3/0607 |
| 2021/0157762 A1* | 5/2021 | Kwon ................... | G06F 13/385 |
| 2022/0075540 A1* | 3/2022 | Sato ...................... | G06F 3/0659 |
| 2022/0147470 A1 | 5/2022 | Lee et al. | |
| 2024/0012578 A1* | 1/2024 | Lee ........................ | G06F 3/0679 |
| 2025/0245147 A1* | 7/2025 | Kang .................. | G06F 12/0246 |

* cited by examiner

*Primary Examiner* — Nimesh G Patel

(74) *Attorney, Agent, or Firm* — DENTONS Durham Jones Pinegar

(57) ABSTRACT

A data storage device includes a performance determination system. The performance determination system determines the capabilities of a host device to which the data storage device is connected. The performance determination system also determines the performance requirements associated with the capabilities of the host device. When the performance requirements are determined, the performance determination system determines the type and amount of resources that are needed to meet the performance requirements. The performance determination system compares the determined amount and type of resources to the type and amount of available resources provided by the data storage device. The performance determination system then determines at least one of a memory die programming method and a memory die programming parameter that will be used when various operations are performed on the data storage device.

20 Claims, 4 Drawing Sheets

ALLOCATING DATA STORAGE DEVICE RESOURCES BASED ON DETERMINED CAPABILITIES OF A HOST DEVICE

BACKGROUND

Some data storage devices, such as external/removable data storage devices, can operate using different communication protocols or different communication protocol versions. For example, an external data storage device, when connected to a host device, can operate in, or support, a USB 4 mode, a USB 3.2 mode, a USB. 3.1 mode and so on. Each mode is associated with a particular programming or operation speed. For example, USB 4 supports speeds up to four gigabits per second (Gbps), USB 3.2 supports speeds up to two Gbps and so on. Typically, the protocol version that is used by the external data storage device, and the associated speed, is based on the capabilities of the host device.

However, regardless of the capabilities of the host device, data storage devices have a single configuration that requires the highest level of performance. As such, resources are allocated within the controller of the data storage device based on the single configuration. For example, the configuration, and the resources that are allocated based on the configuration, are the same regardless of whether or not the host device can utilize the allocated resources.

For example, the same resources are allocated, and the same configuration is used, when the data storage device is connected to different host devices-regardless of the communication protocol that is supported by the host device. Thus, if the data storage device supports the USB 4 protocol but the host device operates with a slower speed communication protocol (e.g., USB 3.2 protocol), the data storage device will allocate the same resources that are needed for USB 4, but have an excess amount of available resources.

Accordingly, it would be beneficial for a data storage device to allocate resources based on determined capabilities of a host device.

SUMMARY

The present disclosure describes a performance determination system that is associated with a data storage device. The performance determination system determines one or more capabilities of a host device to which the data storage device is connected. The performance determination system also determines the performance requirements associated with the communication protocol utilized by the host device.

In an example, the performance determination system also determines the type and/or amount of resources (e.g., hardware resources of the data storage device) that are needed or required to meet the performance requirements of the host device and/or the communication protocol. In an example, the performance requirements include, but are not limited to, an amount of random access memory (RAM) needed to achieve the performance requirements, a controller speed or CPU speed needed to achieve the performance requirements and/or the direct memory access (DMA) speed needed to achieve the desired performance requirements.

The performance determination system also compares the determined amount and/or type of resources to the type/amount of available resources provided by the data storage device. Based, at least in part, on the determined amount and/or type of available resources, the performance determination system determines a memory die programming method and/or a memory die programming parameter that will be used when performing various operations on the data storage device.

Accordingly, examples of the present disclosure describe a method that includes determining a communication protocol associated with a host device. The method also includes determining performance requirements associated with the communication protocol. In an example, the method also includes determining at least one of a memory die programming method and a memory die programming parameter based, at least in part, on the determined performance requirements and on one or more resources associated with a memory device. The memory device is then configured to perform one or more programming operations according to the at least one of the memory die programming method and the memory die programming parameter.

Additional examples describe a data storage device that includes a controller and a performance determination system. In an example, the performance determination system is operable to determine, in response to a configuration event, performance requirements of a communication protocol associated with a host device. The performance determination system is also operable to determine at least one of a memory die programming method and a memory die programming parameter based, at least in part, on the determined performance requirements. The performance determination system is also operable to configure the data storage device to perform one or more programming operations according to the at least one of the memory die programming method and the memory die programming parameter.

Still other examples describe a data storage device that includes a controller means and a means for determining performance requirements of a communication protocol associated with a host device. The data storage device also includes a means for determining at least one of a memory die programming method and a memory die programming parameter based, at least in part, on the determined performance requirements. In an example, the data storage device also includes a means for configuring the data storage device to perform one or more programming operations according to the at least one of the memory die programming method and the memory die programming parameter.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
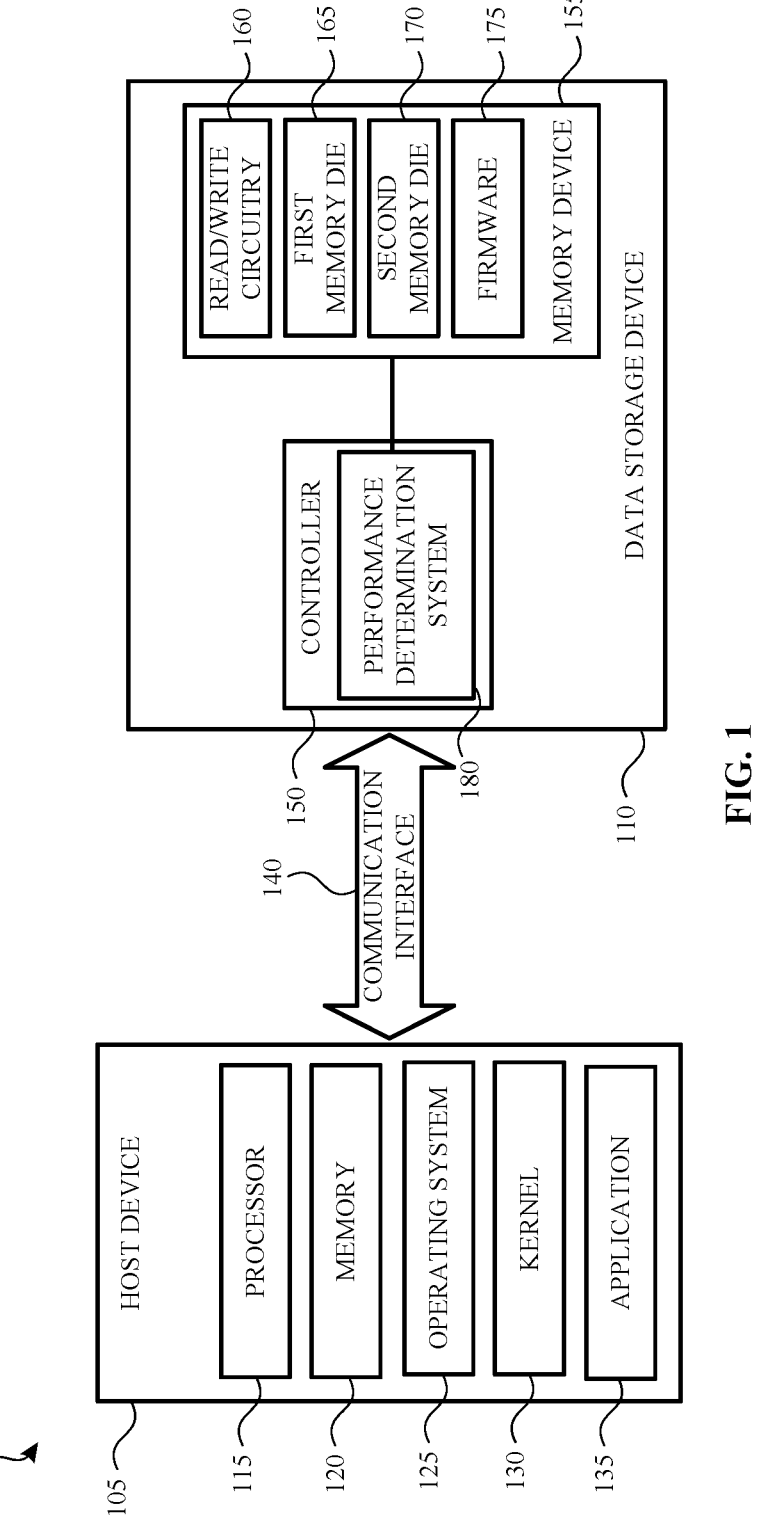
FIG. 1 is a block diagram of a system that includes a host device and a data storage device according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. The following detailed description is therefore not to be taken in a limiting sense, and the scope of the present disclosure is defined by the appended claims and their equivalents.

Data storage devices, such as external data storage devices and removable data storage devices, operate using different communication protocols, or different versions of a communication protocol. For example, an external data storage device can operate in, or support, a number of different versions of the USB communication protocol. For example, the external data storage device can operate in a USB 4 mode, a USB 3.2 mode, a USB. 3.1 mode and so on. Each mode, or communication protocol version, is associated with a particular programming speed or operation speed. For example, USB 4 supports programming or writing speeds up to four gigabits per second (Gbps) while USB 3.2 supports programming or writing speeds up to two Gbps.

Typically, the protocol version that is used, and the associated writing speed, is based on the capabilities of the host device. However, regardless of the capabilities of the host device, the data storage device has a single configuration. As such, resources (e.g., RAM, CPU speeds and direct memory access (DMA) speeds) of the data storage device are allocated by the controller of the data storage device based on the single configuration, regardless of whether or not the host device supports the configuration and/or needs the resources.

For example, the same resources are allocated, and same configuration is used, when the data storage device is connected to a host device that supports USB 4 and when the data storage device is connected to a host device that supports USB 3.X. However, when resources are allocated but not used and/or when certain configurations are used, the endurance of the data storage device may be negatively impacted.

To address the above, the present disclosure describes a data storage device having a controller and a performance determination system. In an example, the performance determination system determines one or more capabilities of a host device to which the data storage device is connected. In an example, the one or more capabilities include a communication protocol used by, or otherwise associated with, the host device. For example, the performance determination system determines whether the host device utilizes a USB 4 communication protocol, a USB 3.X communication protocol and so on.

When the capabilities of the host device are determined, the performance determination system also determines performance requirements of the identified capabilities of the host device. For example, the performance determination system determines the hardware resources that are needed or required to support the identified communication protocol. In an example, the performance requirements include, but are not limited to, an amount of random access memory (RAM) needed to achieve the performance requirements, a controller speed or CPU speed needed to achieve the performance requirements and/or the DMA speed needed to achieve the performance requirements specified by the communication protocol.

In an example, the performance requirements specified by the communication protocol are associated with different operating modes of the data storage device. For example, in a first operating mode (e.g., a burst mode), the performance requirement may indicate that write speeds up to four gigabits per second (Gbps) must be supported. Likewise, when the data storage device is in a second operating mode (e.g., a sustained mode), the performance requirements may indicate that a write speed of three Gpbs must be supported.

When the performance requirements are determined, the performance determination system determines the amount and/or the type of resources that are needed to achieve the performance requirements. The performance determination system also compares the determined amount and/or type of resources to the available resources of the data storage device. Based, at least in part, on the determined amount and/or type of available resources, the performance determination system determines a memory die programming method and/or a memory die programming parameter that will be used when executing various operations on the data storage device when the data storage device is connected to the host device with the determined performance requirements.

In an example, the memory die programming method is an on chip copy (OCC) programming method. In another example, the memory die programming method is a copy through controller (CTC) programming method. Additionally, in an example, the memory die programming parameter is a memory die trim programming parameter.

In some examples, the endurance and/or the quality of service (QOS) of the data storage device will be enhanced or increased based on the memory die programming method and/or on the memory die trim programming parameter. For example, the endurance or lifetime and/or the QoS of the data storage device may be increased/enhanced if the CTC programming method when compared to the OCC programming method. Additionally, the endurance of the data storage device may be increased if a particular memory die trim programming parameter is used when compared with other memory die programming trims.

For example, the endurance of the data storage device will be increased if data is programmed slower and/or using a lower voltage when compared to faster programming using a higher voltage. Thus, the performance determination system determines, based on the specified requirements of the communication protocol and on available resources of the data storage device, whether data can be written to the data storage device using the CTC programming method, the OCC programming method and/or one or more memory die programming trims.

When the memory die programming method and/or the memory die programming parameter are determined, the controller of the data storage device programs firmware of the data storage device according to the memory die programming method and/or the memory die programming parameter. Data is then written to the data storage device using the determined programming method and/or the memory die programming parameter when the data storage device is connected to the host device.

In accordance with the above, many technical benefits may be realized including, but not limited to reducing error propagation by selectively determining whether to utilize the CTC programming method in lieu of the OCC programming method based on host device performance requirements, reducing the frequency of scrubbing operations as a result of the reduced error propagation and increasing the endurance of the data storage device by only utilizing resources that are needed based on the capabilities of the host device.

These benefits, along with other examples, will be shown and described in greater detail with respect to FIG. 1-FIG. 5.

FIG. 1 is a block diagram of a system 100 that includes a host device 105 and a data storage device 110 according to an example. In an example, the host device 105 includes a processor 115 and a memory 120 (e.g., main memory). The memory 120 may include or otherwise be associated with an operating system 125, a kernel 130 and/or an application 135.

The processor 115 can execute various instructions, such as, for example, instructions from the operating system 125 and/or the application 135. The processor 115 may include circuitry such as a microcontroller, a Digital Signal Processor (DSP), an Application-Specific Integrated Circuit (ASIC), a Field Programmable Gate Array (FPGA), hardwired logic, analog circuitry and/or various combinations thereof. In an example, the processor 115 may include a System on a Chip (SoC).

In an example, the memory 120 can be used by the host device 105 to store data used, or otherwise executed by, the processor 115. Data stored in the memory 120 may include instructions provided by the data storage device 110 via a communication interface 140. The data stored in the memory 120 may also include data used to execute instructions from the operating system 125 and/or one or more applications 135. The memory 120 may be a single memory or may include multiple memories, such as, for example one or more non-volatile memories, one or more volatile memories, or a combination thereof.

In an example, the operating system 125 may create a virtual address space for the application 135 and/or other processes executed by the processor 115. The virtual address space may map to locations in the memory 120. The operating system 125 may also include or otherwise be associated with a kernel 130. The kernel 130 may include instructions for managing various resources of the host device 105 (e.g., memory allocation), handling read and write requests and so on.

The communication interface 140 communicatively couples the host device 105 and the data storage device 110. The communication interface 140 may be a Serial Advanced Technology Attachment (SATA), a PCI express (PCIe) bus, a Small Computer System Interface (SCSI), a Serial Attached SCSI (SAS), Ethernet, Fibre Channel, or Wi-Fi. As such, the host device 105 and the data storage device 110 need not be physically co-located and may communicate over a network such as a Local Area Network (LAN) or a Wide Area Network (WAN), such as the internet. In addition, the host device 105 may interface with the data storage device 110 using a logical interface specification such as Non-Volatile Memory express (NVMe) or Advanced Host Controller Interface (AHCI).

In some examples, the data storage device 110 is attached to, or embedded within, the host device 105. In another example, the data storage device 110 is a component (e.g., a solid-state drive (SSD)) of a network accessible data storage system, a network-attached storage system, a cloud data storage system, and the like. In yet other examples, the data storage device 110 is implemented as an external device or a portable device that can be communicatively or selectively coupled to the host device 105.

For example, the data storage device 110 is a USB drive or a USB data storage device and is communicatively coupled to the host device 105 using one or more host interfaces (e.g., a USB interface). In such an example, the communication interface 140 between the host device 105 and the data storage device 110 is a USB communication protocol (e.g., USB 4 communication protocol, USB 3.X communication protocol). In another example, the data storage device 110 is a USB type C data storage device or a USB type B data storage device.

The data storage device 110 includes a controller 150 and a memory device 155. The controller 150 is communicatively coupled to the memory device 155. In an example, the memory device 155 includes one or more memory dies (e.g., first memory die 165 and second memory die 170). Although two memory dies are shown, the memory device 155 may include any number of memory dies (e.g., one memory die, two memory dies, eight memory dies, or another number of memory dies). Additionally, although memory dies are specifically mentioned, the memory device 155 may include any non-volatile memory device, storage device, storage elements or storage medium including NAND flash memory cells and/or NOR flash memory cells.

The memory cells can be one-time programmable, few-time programmable, or many-time programmable. Additionally, the memory cells may be single-level cells (SLCs), multi-level cells (MLCs), triple-level cells (TLCs), quad-level cells (QLCs), penta-level cells (PLCs), and/or use any other memory technologies. The memory cells may be arranged in a two-dimensional configuration or a three-dimensional configuration.

In an example, one or more of the first memory die 165 and the second memory die 170 include one or more memory blocks. In an example, each memory block includes one or more memory cells. A block of memory cells is the smallest number of memory cells that are physically erasable together. In an example and for increased parallelism, each of the blocks may be operated or organized in larger blocks or metablocks. For example, one block from different planes of memory cells may be logically linked together to form a metablock.

In an example, the data storage device 110 and/or the memory device 155 includes a first partition and a second partition. In such examples, each partition includes different types of memory blocks. For example, the first partition is a cache partition and includes a number of SLC memory blocks. The second partition is a primary storage partition and includes a number of TLC memory blocks.

Although TLC memory blocks are specifically mentioned, the primary storage partition may include MLC memory blocks, QLC memory blocks, and/or PLC memory blocks. Additionally, the data storage device 110 may implement a hybrid architecture. As such, a subset of the TLC memory blocks may be identified as hybrid memory blocks. Accordingly, each hybrid memory block may be programmable in a first mode (e.g., a TLC mode) or a second mode (e.g., a SLC mode).

The memory device 155 also includes support circuitry. In an example, the support circuitry includes read/write circuitry 160. The read/write circuitry 160 supports the operation of the memory dies of the memory device 155. Although the read/write circuitry 160 is depicted as a single component, the read/write circuitry 160 may be divided into separate components, such as, for example, read circuitry and write circuitry. The read/write circuitry 160 may be external to the memory dies of the memory device 155. In another example, one or more of the memory dies may include corresponding read/write circuitry 160 that is operable to read data from and/or write data to storage elements within one individual memory die independent of other read and/or write operations on any of the other memory dies.

As previously described, the data storage device 110 includes a controller 150. The controller 150 is communicatively coupled to the memory device 155 via a bus, an interface or other communication circuitry. In an example, the communication circuitry includes one or more channels to enable the controller 150 to communicate with the first memory die 165 and/or the second memory die 170 of the memory device 155. In another example, the communication circuitry includes multiple distinct channels which enables the controller 150 to communicate with the first memory die 165 independently and/or in parallel with the second memory die 170 of the memory device 155.

The controller 150 includes circuitry for executing instructions. For example, the controller 150 includes one or more processors, one or more microcontrollers, one or more DSPs, one or more ASICs, one or more FPGAs, hard-wired logic, analog circuitry and/or a combination thereof. In another example, the controller 150 includes a SoC or multiple SoCs. Although a single controller 150 is shown and described, the data storage device 110 can include multiple controllers 150. In such examples, each controller 150 is responsible for particular operations (or a subset of operations) described herein.

In an example, the controller 150 receives instructions from the host device 105. In another example, the instructions originate from firmware 175 associated with the data storage device 110 and/or the memory device 155. In an example, the firmware 175 provides instructions to the controller 150 regarding memory die programming methods and/or memory die programming parameters (e.g., NAND die trim parameters) that are to be utilized when writing data to the memory device 155. As will be explained in detail below, the memory die programming method and/or the memory die programming parameters that are used are based, at least in part, on requirements specified by the communication protocol used by the host device 105 and/or on the amount and/or type of resources (e.g., hardware resources) available on the data storage device 110.

In addition to receiving commands and/or data from the host device, the controller 150 also sends data to the host device 105. For example, the controller 150 sends data to and/or receives data from the host device 105 via the communication interface 140. The controller 150 may also send data and/or commands to and/or receive data from the memory device 155.

The controller 150 may send data and a corresponding write command to the memory device 155 to cause the memory device 155 to store data at a specified address of the memory device 155. In an example, the write command specifies a physical address of a portion of the memory device 155. The controller 150 may also send data and/or commands associated with one or more background scanning operations, garbage collection operations, and/or wear leveling operations.

The controller 150 may also send one or more read commands to the memory device 155. In an example, the read command specifies the physical address of a portion of the memory device 155 at which the data is stored. The controller 150 may also track the number of program/erase cycles or other programming operations that have been performed on or by the memory device and/or the memory dies of the memory device 155.

In an example, the controller 150 includes, or is otherwise associated with, a performance determination system 180. The performance determination system 180 may be a packaged functional hardware unit designed for use with other components/systems, a portion of a program code (e.g., software or firmware) executable by a processor or processing circuitry, or a self-contained hardware and/or software component that interfaces with other components and/or systems.

In an example, the performance determination system 180 is operable to determine one or more capabilities of the host device 105. In an example, the one or more capabilities of the host device 105 includes a communication protocol utilized or supported by the host device 105. For example, the host device 105 may utilize or support one or more communication protocols (e.g., USB 4 protocol, USB 3.X protocol). In an example, the performance determination system 180 identifies and/or determines the capabilities of the host device 105 in response to a connection event and/or a configuration event (e.g., when the data storage device 110 is connected to, or is otherwise communicatively coupled to, the host device 105).

When the capabilities of the host device 105 are determined, the performance determination system 180 determines performance requirements specified by the communication protocol and/or the host device 105. For example, the performance determination system 180 determines the amount and/or type of hardware resources that are needed or required to support the performance requirements specified by the communication protocol. In an example, the performance requirements include, but are not limited to, an amount of RAM needed to achieve the performance requirements, a controller speed or CPU speed needed to achieve the performance requirements and/or the DMA speed needed to achieve the performance requirements specified by the communication protocol.

In an example, the performance requirements specified by the communication protocol are associated with different operating modes of the data storage device 110. For example, in a first operating mode (e.g., a burst mode), the performance requirement may indicate that write speeds up to four gigabits per second (Gbps) must be supported. Likewise, when the data storage device 110 is in a second operating mode (e.g., a sustained mode), the performance requirements may indicate that a write speed of three Gbps must be supported.

When the performance requirements are determined, the performance determination system 180 determines the amount and/or type of resources that are needed to achieve the performance requirements. The performance determination system 180 also compares the determined amount and/or type of resources to the available resources of the data storage device 110.

Based, at least in part, on the determined amount and/or type of available resources, the performance determination system 180 determines a memory die programming method and/or a memory die programming parameter that will be used when performing various operations on the data storage device when the data storage device is connected to this particular host device. This configuration is then stored by the data storage device 110 and/or programmed into the firmware 175. As such, when programming instructions are received from the host device 105, the programming instructions are performed using the determined memory die programming method and/or memory die programming parameter.

In some examples, the configuration information (e.g., the memory die programming method and/or the memory die programming parameter) is associated with a particular host device 105. Thus, if the data storage device 110 is removed from, and subsequently connected to, the same host device 105, the controller 150 and/or the performance determination system 180 detects or determines that this host device 105 is associated with particular configuration information. The configuration information is then loaded into the firmware 175 (if needed).

In other examples, the data storage device 110 is communicatively coupled to, and removed from, a number of different host devices 105. In such examples, the data storage device 110 stores configuration information associated with each of the different host devices 105. When the data storage device 110 is connected to a particular host device 105, the performance determination system identifies configuration information associated with the particular host device 105 (e.g., using an identifier associated with the particular host device 105 and/or using an identifier associated with the configuration information) and loads the associated configuration information.

As previously explained, the performance determination system 180 is operable to determine a memory die programming method that will be used when executing instructions received from the host device 105. In an example, the memory die programming method that is selected is based, at least in part, on the performance requirements specified by the communication protocol, the capabilities of the host device and/or on the amount/type of available resources of the data storage device 110. In another example, the memory die programming methods are arranged in a hierarchy or are selected based, at least in part, on endurance enhancement factors (e.g., which programming method will prolong the lifetime of the data storage device).

In an example, the memory die programming methods include, but are not limited to, an on chip copy (OCC) programming method and a copy through controller (CTC) programming method. In an OCC programming method, data is typically stored in a SLC portion (e.g., a cache partition) of the memory device 155. When the data is transferred to a TLC portion (e.g., a primary storage partition) of the memory device 155, the data is sensed from the SLC memory cells and moved (via one or more latches) to TLC memory cells.

However, because the data is transferred from the SLC memory cells to the TLC memory cells, any errors (e.g., bit flips) in the data is propagated to the TLC memory cells. Additionally, as data is moved or relocated (e.g., in response to garbage collection operations), there is a risk that the errors continue to propagate. While these errors are typically corrected by an error correction code (ECC) system associated with the controller when the data is read, in an example, the performance determination system 180 is configured to use the CTC programming method when possible (e.g., when the available resources can execute the CTC programming method while still complying with the performance requirements of the communication protocol).

In the CTC programming method, when data is moved from the SLC portion to the TLC portion, the data is passed to the controller 150. The controller 150 stores the data in internal RAM and provides the data to the ECC system (e.g., a low-density parity-check decoder). The ECC system corrects any errors that may be present in the data. The ECC system also adds parity to the data to assist in additional error correction operations. When the data has been checked and/or corrected, the data is moved (via one or more latches) to the TLC memory cells.

The OCC programming method typically requires less RAM and has slower DMA speeds when compared with the CTC programming method, which typically requires more RAM and has higher DMA speeds. However, as indicated above, using the CTC programming method may increase the lifetime or endurance of the data storage device 110 as errors are corrected as data is moved from SLC to TLC, rather than being propagated to the TLC when the OCC programming method is used.

In an example, the performance determination system 180 also determines the memory die programming parameters that will be used when instructions from the host device 105 are executed. In an example, the memory die programming parameters are based, at least in part, on the performance requirements specified by the communication protocol, the capabilities of the host device and/or on the amount/type of available resources of the data storage device 110.

In an example, the memory die programming parameters include memory die trim parameters (also referred to as NAND trim parameters). Example memory die trim parameters include a speed and/or a voltage at which data is written to the memory dies of the memory device 155.

For example, a higher voltage is used to reach faster programming speeds while a lower voltage is used when lower programming speeds are acceptable. However, in some examples, the endurance of the memory dies, and therefore the endurance of the data storage device 110, is reduced when higher voltages/speeds are used to write the data to the memory dies. As such, in an example, the performance determination system 180 is configured to use the lower voltages and/or a slower programming speed when possible (e.g., while complying with the performance requirements of the communication protocol).

In an example, the performance determination system 180 is operable to select one or both of the memory die programming methods and the memory die programming parameters when executing instructions received from the host device 105. For example, when resources are available and when performance requirements are met, the performance determination system selects CTC programming at lower voltages/programming speeds. However, in other examples, the performance determination system 180 selects other combinations of memory die programming methods and/or memory die programming parameters.

In an example, when particular configurations are determined, the performance determination system 180 programs the firmware 175 using the determined configuration information.

Figure 2:
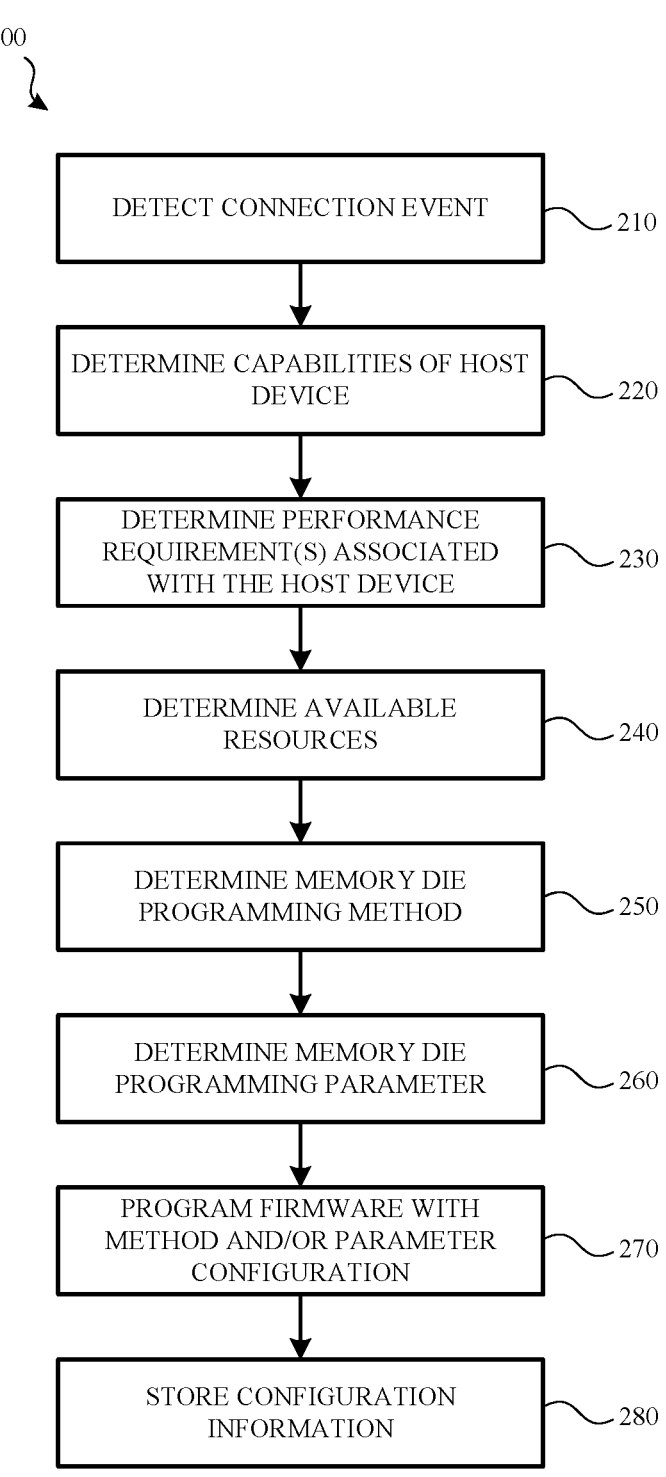
FIG. 2 illustrates a method for allocating resources of a data storage device based on determined capabilities of a host device according to an example.

FIG. 2 illustrates a method 200 for allocating resources of a data storage device based on determined capabilities of a host device according to an example. In an example, the method 200 is performed by a controller and/or a performance determination system of a data storage device. For example, the method 200 is performed by the controller 150 and/or the performance determination system 180 of the data storage device 110 shown and described with respect to FIG. 1.

Method 200 begins when the performance determination system detects (210) a connection event. In an example, the data storage device in which the performance determination system is included is a removable or external data storage device. For example, the data storage device includes a USB connector (or other connector) that enables the data storage device to be removably coupled to the host device. Thus, method 200 begins when the data storage device is connected to a communication port or interface of the host device. Although a removable data storage device is specifically mentioned, the method 200 may be executed by an internal data storage device or any type of data storage device.

When the data storage device is connected to the host device, the performance determination system determines (220) the capabilities of the host device. In an example, the capabilities of the host device are based, at least in part, on a communication protocol utilized by the host device. For example, if the data storage device is connected to a USB port of the host device, the performance determination system determines which USB communication protocol the host device supports. Although the USB communication protocol is specifically mentioned, other communication protocols may be used and detected.

When the capabilities of the host device are determined, the performance determination system also determines the performance requirements associated with the host device. For example, when the capabilities of the data storage device is a determination regarding the communication protocol, the performance determination system determines one or more performance requirements specified by the communication protocol. In an example, the performance requirements are stored by the data storage device. In another example, the host device provides the performance requirements to the performance determination system (e.g., as part of the connection event and/or the host device capability detection operation previously described).

In an example, the performance requirements include information regarding hardware resources that are needed or required to support the identified communication protocol. For example, the performance requirements include, but are not limited to, an amount of RAM needed to achieve the performance requirements, a controller speed or CPU speed needed to achieve the performance requirements and/or the DMA speed needed to achieve the performance requirements specified by the communication protocol.

In an example, the performance requirements specified by the communication protocol are associated with different operating modes of the data storage device. For example, a first operating mode is associated with a first performance requirement and a second operating mode is associated with a second performance requirement.

In an example, when the performance requirements are determined, the performance determination system determines (240) the resources (e.g., hardware resources) of the data storage device. In an example, the hardware resources include, but are not limited to, an amount of RAM associated with the controller of the data storage device, an amount of memory dies in the data storage device, DMA speeds associated with the controller, a speed of the controller and so on.

Using one or more of the performance requirements and/or the available resources of the data storage device, the performance determination system determines (250) a memory die programming method and/or determines (260) a memory die programming parameter that will be used when executing instructions that are received from the host device. In an example, the memory die programming method is a CTC programming method or an OCC programming method and the memory die programming parameter is a memory die trim parameter.

In an example, the performance determination system is operable to select the memory die programming method and/or the memory die programming parameter based, at least in part on a predetermined preference or hierarchy and/or in an effort to extend or enhance the durability and or endurance of the data storage device. In one example, the performance determination system selects a particular memory die programming method and a particular memory die programming parameter in an attempt to take advantage of the benefits offered by both. However, it is also contemplated that the performance determination system selects a particular memory die programming method or a particular memory die programming parameter.

For example, a maximum programming speed of all memory dies may be 1200 MBps. However, in this example, the maximum speed programming possible due to the available amount of RAM and DMA using CTC is 900 MBps—which is a 300 MBps drop (e.g., due to a slower DMA speed and less available RAM). However, using OCC, the programming speed may be 1100 MBps. Although the max programming speed of OCC may be 1100 MBps, the current host max speed may be 1000 MBps. In this example, the host device cannot use CTC as it will reduce performance. As a result, OCC will be used. However, the performance determination system can still reduce the programming speed (e.g., by a margin of 100 MBps) by changing NAND Trim parameters to reduce error propagation.

In one example, one memory die programming method may be preferrable over another memory die programming method. For example, the performance determination system is programmed to select the CTC programming method over the OCC programming method when the available resources enable the data storage device to achieve the specified performance requirements when utilizing the CTC programming method. Likewise, in an example, the performance determination system is operable to select lower voltage/slower memory die trim parameters in an effort to extend or enhance the endurance of the data storage device.

When the performance determination system determines one or more of the memory die programming method and/or the memory die programming parameter, the performance determination system programs (270) firmware of the data storage device with the configuration information (e.g., the selected/determined memory die programming method and/or the memory die programming parameter). As such, when one or more instructions or operations are received from the host device, the instructions are executed using configuration information.

In an example, the performance determination system also causes the configuration information to be stored (280). In an example, the configuration information is stored by one or more memory dies of the data storage device. In some examples, the configuration information is stored with, or is associated with, a host device identifier. As such, if the data storage device is removably coupled to the host device a number of different times (or is connected to a number of different host devices), the configuration information associated with the detected/identified host device can be retrieved and loaded in the firmware.

Figure 3:
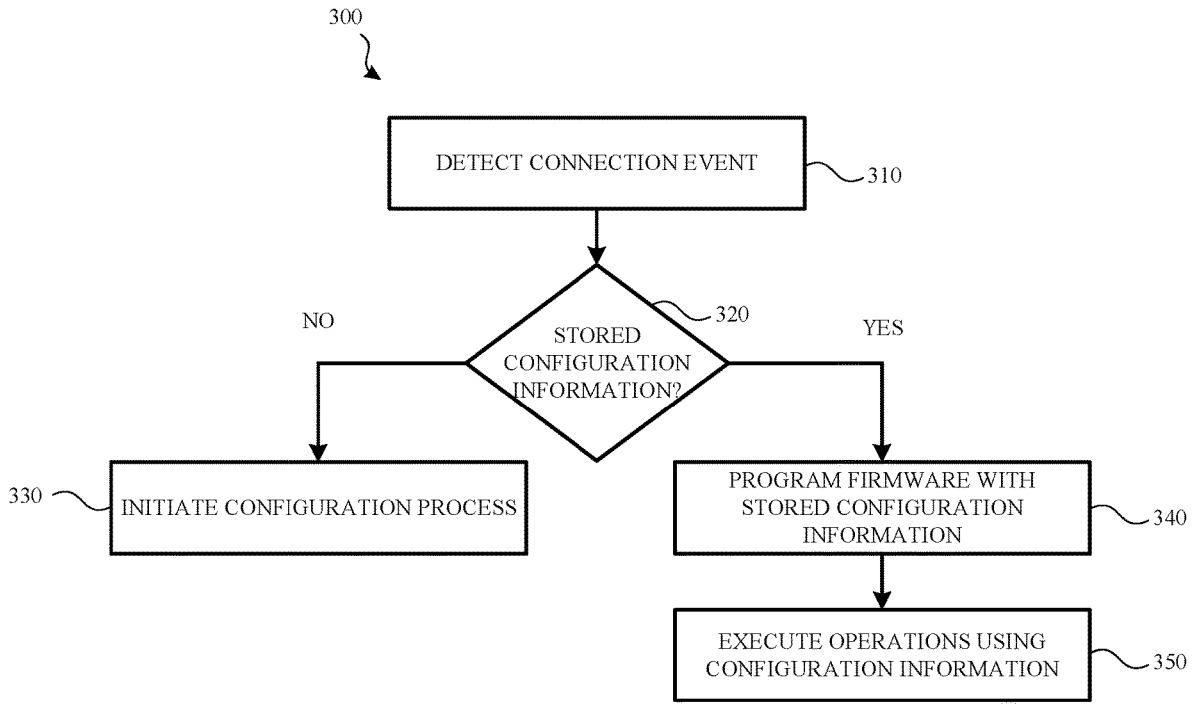
FIG. 3 illustrates a method for configuring a data storage device based on determined capabilities of a host device according to an example.

FIG. 3 illustrates a method 300 for configuring a data storage device based on determined capabilities of a host device according to an example. In an example, the method 300 is performed by a controller and/or a performance determination system of a data storage device. For example, the method 200 is performed by the controller 150 and/or the performance determination system 180 of the data storage device 110 shown and described with respect to FIG. 1.

Method 300 begins when the performance determination system detects (310) a connection event. In an example, the connection event is similar to the connection event described with respect to the method 200 shown and described with respect to FIG. 2. In an example, as part of the connection event, the performance determination system identifies the host device to which the data storage device is connected. In an example, the host device is identified using a host identifier or other identifying information. In another example, the host device is identified based, at least in part, on the determined capabilities (e.g., the communication protocol) of the host device.

When the connection event is detected, the performance determination system determines (320) whether configuration information associated with the host device is stored by the data storage device. If the performance determination system determines (320) that configuration information associated with the host device is not stored by the data storage device (or was stored but is corrupted or is otherwise unusable), the performance determination system initiates (330) a configuration process. In an example, the configuration process is the method 200 (or portions of the method 200) shown and described with respect to FIG. 2.

However, if the performance determination system determines (320) that configuration information associated with the host device is stored by the data storage device, the performance determination system identifies the stored configuration information associated with the host device (e.g., using configuration identification information) and programs (340) firmware of the data storage device using the configuration information. One or more operations or instructions received by the host device are then executed (350) using the configuration information.

Figures 4, 5:
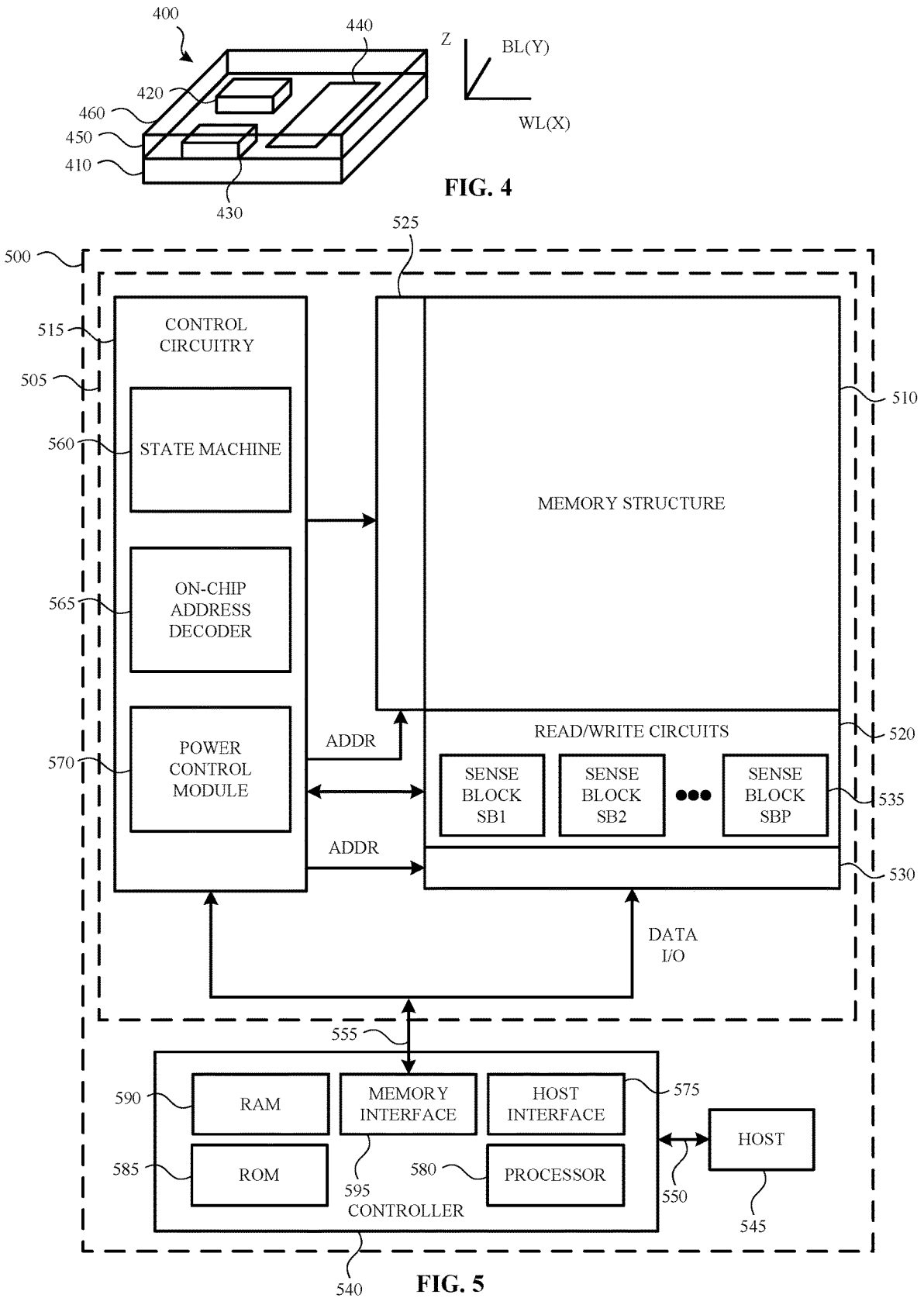
FIG. 4 is a perspective view of a storage device that includes three-dimensional (3D) stacked non-volatile memory according to an example.
FIG. 5 is a block diagram of a storage device according to an example.

FIG. 4-FIG. 5 describe example storage devices that may be used with or otherwise implement the various features described herein. For example, the storage devices shown and described with respect to FIG. 4-FIG. 5 may include various systems and components that are similar to the systems and components shown and described with respect to FIG. 1. For example, the controller 540 shown and described with respect to FIG. 5 may be similar to the controller 150 of FIG. 1. Likewise, the memory dies 505 may be similar to the first memory die 165 and/or the second memory die 170 of FIG. 1.

FIG. 4 is a perspective view of a storage device 400 that includes three-dimensional (3D) stacked non-volatile memory according to an example. In this example, the storage device 400 includes a substrate 410. Blocks of memory cells are included on or above the substrate 410. The blocks may include a first block (BLK0 420) and a second block (BLK1 430). Each block may be formed of memory cells (e.g., non-volatile memory elements). The substrate 410 may also include a peripheral area 440 having support circuits that are used by the first block and the second block.

The substrate 410 may also carry circuits under the blocks, along with one or more lower metal layers which are patterned in conductive paths to carry signals from the circuits. The blocks may be formed in an intermediate region 450 of the storage device 400. The storage device may also include an upper region 460. The upper region 460 may include one or more upper metal layers that are patterned in conductive paths to carry signals from the circuits. Each block of memory cells may include a stacked area of memory cells. In an example, alternating levels of the stack represent word lines. While two blocks are depicted, additional blocks may be used and extend in the x-direction and/or the y-direction.

In an example, a length of a plane of the substrate 410 in the x-direction represents a direction in which signal paths for word lines or control gate lines extend (e.g., a word line or drain-end select gate (SGD) line direction) and the width of the plane of the substrate 410 in the y-direction represents a direction in which signal paths for bit lines extend (e.g., a bit line direction). The z-direction represents a height of the storage device 400.

FIG. 5 is a functional block diagram of a storage device 500 according to an example. In an example, the storage device 500 may be the 3D stacked non-volatile storage device 400 shown and described with respect to FIG. 4. The components depicted in FIG. 5 may be electrical circuits. In an example, the storage device 500 includes one or more memory dies 505. Each memory die 505 includes a three-dimensional memory structure 510 of memory cells (e.g., a 3D array of memory cells), control circuitry 515, and read/write circuits 520. In another example, a two-dimensional array of memory cells may be used. The memory structure 510 is addressable by word lines using a first decoder 525 (e.g., a row decoder) and by bit lines using a second decoder 530 (e.g., a column decoder). The read/write circuits 520 may also include multiple sense blocks 535 including SB1, SB2, . . . , SBp (e.g., sensing circuitry) which allow pages of the memory cells to be read or programmed in parallel. The sense blocks 535 may include bit line drivers.

In an example, a controller 540 is included in the same storage device 500 as the one or more memory dies 505. In another example, the controller 540 is formed on a die that is bonded to a memory die 505, in which case each memory die 505 may have its own controller 540. In yet another example, a controller die controls all of the memory dies 505.

Commands and data may be transferred between a host 545 and the controller 540 using a data bus 550. Commands and data may also be transferred between the controller 540 and one or more of the memory dies 505 by way of lines 555. In one example, the memory die 505 includes a set of input and/or output (I/O) pins that connect to lines 555.

The memory structure 510 may also include one or more arrays of memory cells. The memory cells may be arranged in a three-dimensional array or a two-dimensional array. The memory structure 510 may include any type of non-volatile memory that is formed on one or more physical levels of arrays of memory cells having an active area disposed above a silicon substrate. The memory structure 510 may be in a non-volatile memory device having circuitry associated with the operation of the memory cells, whether the associated circuitry is above or within the substrate.

The control circuitry 515 works in conjunction with the read/write circuits 520 to perform memory operations (e.g., erase, program, read, and others) on the memory structure 510. The control circuitry 515 may include registers, ROM fuses, and other devices for storing default values such as base voltages and other parameters.

The control circuitry 515 may also include a state machine 560, an on-chip address decoder 565 and a power control module 570. The state machine 560 may provide chip-level control of various memory operations. The state machine 560 may be programmable by software. In another example, the state machine 560 does not use software and is completely implemented in hardware (e.g., electrical circuits).

The on-chip address decoder 565 may provide an address interface between addresses used by host 545 and/or the controller 540 to a hardware address used by the first decoder 525 and the second decoder 530.

The power control module 570 may control power and voltages that are supplied to the word lines and bit lines during memory operations. The power control module 570 may include drivers for word line layers in a 3D configuration, select transistors (e.g., SGS and SGD transistors) and source lines. The power control module 570 may include one or more charge pumps for creating voltages.

The control circuitry 515, the state machine 560, the on-chip address decoder 565, the first decoder 525, the second decoder 530, the power control module 570, the sense blocks 535, the read/write circuits 520, and/or the controller 540 may be considered one or more control circuits and/or a managing circuit that perform some or all of the operations described herein.

In an example, the controller 540, is an electrical circuit that may be on-chip or off-chip. Additionally, the controller 540 may include one or more processors 580, ROM 585, RAM 590, memory interface 595, and host interface 575, all of which may be interconnected. In an example, the one or more processors 580 is one example of a control circuit. Other examples can use state machines or other custom circuits designed to perform one or more functions. Devices such as ROM 585 and RAM 590 may include code such as a set of instructions. One or more of the processors 580 may be operable to execute the set of instructions to provide some or all of the functionality described herein.

Alternatively or additionally, one or more of the processors 580 may access code from a memory device in the memory structure 510, such as a reserved area of memory cells connected to one or more word lines. The memory interface 595, in communication with ROM 585, RAM 590, and one or more of the processors 580, may be an electrical circuit that provides an electrical interface between the controller 540 and the memory die 505. For example, the memory interface 595 may change the format or timing of signals, provide a buffer, isolate from surges, latch I/O, and so forth.

The one or more processors 580 may issue commands to control circuitry 515, or any other component of memory die 505, using the memory interface 595. The host interface 575, in communication with the ROM 585, the RAM 595, and the one or more processors 580, may be an electrical circuit that provides an electrical interface between the controller 540 and the host 545. For example, the host interface 575 may change the format or timing of signals, provide a buffer, isolate from surges, latch I/O, and so on. Commands and data from the host 545 are received by the controller 540 by way of the host interface 575. Data sent to the host 545 may be transmitted using the data bus 550.

Multiple memory elements in the memory structure 510 may be configured so that they are connected in series or so that each element is individually accessible. By way of a non-limiting example, flash memory devices in a NAND configuration (e.g., NAND flash memory) typically contain memory elements connected in series. A NAND string is an example of a set of series-connected memory cells and select gate transistors.

A NAND flash memory array may also be configured so that the array includes multiple NAND strings. In an example, a NAND string includes multiple memory cells sharing a single bit line and are accessed as a group. Alternatively, memory elements may be configured so that each memory element is individually accessible (e.g., a NOR memory array). The NAND and NOR memory configurations are examples and memory cells may have other configurations.

The memory cells may be arranged in the single memory device level in an ordered array, such as in a plurality of rows and/or columns. However, the memory elements may be arrayed in non-regular or non-orthogonal configurations, or in structures not considered arrays.

In an example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, such as in the y direction) with each column having multiple memory cells. The vertical columns may be arranged in a two-dimensional arrangement of memory cells, with memory cells on multiple vertically stacked memory planes. Other configurations of memory elements in three dimensions can also constitute a 3D memory array.

In another example, in a 3D NAND memory array, the memory elements may be coupled together to form vertical NAND strings that traverse across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

One of ordinary skill in the art will recognize that the technology described herein is not limited to a single specific memory structure, but covers many relevant memory structures within the spirit and scope of the technology as described herein and as understood by one of ordinary skill in the art. One of skill in the art also will note that while the invention is described in terms of SLC and TLC memory blocks, in some examples, quad-level cell (QLC) memory blocks and multi-level cell (MLC) blocks may be substituted for TLC memory blocks.

Based on the above, examples of the present disclosure describe a method, comprising: determining a communication protocol associated with a host device; determining performance requirements associated with the communication protocol; determining at least one of a memory die programming method and a memory die programming parameter based, at least in part, on the determined performance requirements and on one or more resources associated with a memory device; and configuring the memory device to perform one or more programming operations according to the at least one of the memory die programming method and the memory die programming parameter. In an example, configuring the memory device comprises configuring firmware of the memory device to perform the one or more programming operations according to the at least one of the memory die programming method and the memory die programming parameter. In an example, the memory die programing method is selected from a group of programming methods comprising an on chip copy (OCC) programming method and a copy through controller (CTC) programming method. In an example, the memory die programming parameter is a memory trim parameter. In an example, the memory trim parameter is a programming voltage. In an example, the communication protocol is determined in response to a connection event. In an example, the memory device is a removable memory device. In an example, the one or more resources associated with the memory device are selected from a group comprising, random access memory (RAM) of the memory device, a speed of a controller associated with the memory device, and a direct memory access (DMA) speed associated with the memory device. In an example, configuring the memory device comprises allocating the one or more resources to perform an operation based, at least in part, on the memory die programming method and the memory die programming parameter.

Examples also describe a data storage device, comprising: a controller; and a performance determination system associated with the controller and operable to: determine, in response to a configuration event, performance requirements of a communication protocol associated with a host device; determine at least one of a memory die programming method and a memory die programming parameter based, at least in part, on the determined performance requirements; and configure the data storage device to perform one or more programming operations according to the at least one of the memory die programming method and the memory die programming parameter. In an example, the performance determination system is further operable to configure firmware of the data storage device according to the at least one of the memory die programming method and the memory die programming parameter. In an example, the memory die programing method is selected from a group of programming methods comprising an on chip copy (OCC) programming method and a copy through controller (CTC) programming method. In an example, the memory die programming parameter is a memory trim parameter. In an example, the configuration event is associated with a data storage device connection event. In an example, the data storage device is a removable data storage device. In an example, the performance determination system is further operable to: associate configuration information of the data storage device with the host device; and store the configuration information. In an example, the performance determination system is further operable to load the configuration information in response to a determination that the data storage device is reconnected to the host device.

Examples also describe a data storage device, comprising: a controller means; means for determining performance requirements of a communication protocol associated with a host device; means for determining at least one of a memory die programming method and a memory die programming parameter based, at least in part, on the determined performance requirements; and means for configuring the data storage device to perform one or more programming operations according to the at least one of the memory die programming method and the memory die programming parameter. In an example, the data storage device also includes means for storing configuration information of the data storage device. In an example, the means for determining the performance requirements of the communication protocol associated with host device is operable to determine the performance requirements in response to a configuration event.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this disclosure that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks. Additionally, it is contemplated that the flowcharts and/or aspects of the flowcharts may be combined and/or performed in any order.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:
   determining a communication protocol associated with a host device;
   determining performance requirements associated with the communication protocol;
   comparing the determined performance requirements to available hardware resources of a memory device;
   selecting a memory die programming method and a memory die programming parameter based, at least in part, on the comparison of the determined performance requirements to the available hardware resources, the memory die programming method being selected from a plurality of memory die programming methods arranged in a programming method preference hierarchy; and
   configuring the memory device to perform one or more programming operations according to the memory die programming method and the memory die programming parameter.

2. The method of claim 1, wherein configuring the memory device comprises configuring firmware of the memory device to perform the one or more programming operations according to the memory die programming method and the memory die programming parameter.

3. The method of claim 1, wherein the plurality of memory die programming methods include an on chip copy (OCC) programming method and a copy through controller (CTC) programming method.

4. The method of claim 1, wherein the memory die programming parameter is a memory trim parameter.

5. The method of claim 4, wherein the memory trim parameter is a programming voltage.

6. The method of claim 1, wherein the communication protocol is determined in response to a connection event.

7. The method of claim 1, wherein the one or more hardware resources associated with the memory device are selected from a group comprising, a random access memory (RAM) of the memory device, a speed of a controller associated with the memory device, and a direct memory access (DMA) speed associated with the memory device.

8. The method of claim 1, further comprising associating configuration information with the host device.

9. A data storage device, comprising:
a controller; and
a performance determination system associated with the controller and operable to:
    determine, in response to a configuration event, performance requirements of a communication protocol utilized by a host device;
    compare the determined performance requirements to available hardware resources of the data storage device;
    select a memory die programming method from a plurality of memory die programming methods arranged in a programming method preference hierarchy based, at least in part, on the comparison of the determined performance requirements to the available hardware resources; and
    configure the data storage device to perform one or more programming operations according to the selected memory die programming method.

10. The data storage device of claim 9, wherein the performance determination system is further operable to configure firmware of the data storage device according to the selected memory die programming method.

11. The data storage device of claim 9, wherein the plurality of memory die programming methods include an on chip copy (OCC) programming method and a copy through controller (CTC) programming method.

12. The data storage device of claim 9, wherein the configuration event is associated with a data storage device connection event.

13. The data storage device of claim 9, wherein the data storage device is a removable data storage device.

14. The data storage device of claim 9, wherein the performance determination system is further operable to:
    associate configuration information of the data storage device with the host device; and
    store the configuration information.

15. The data storage device of claim 14, wherein the performance determination system is further operable to load the configuration information in response to a determination that the data storage device is reconnected to the host device.

16. The data storage device of claim 9, wherein the performance determination system is further operable to:
    select a memory die programming parameter based, at least in part, on the determined performance requirements; and
    configure the data storage device to perform the one or more programming operations according to the selected memory die programming method and the memory die programming parameter.

17. The data storage device of claim 16, wherein the memory die programming parameter is a memory trim parameter.

18. A data storage device, comprising:
a controller means;
means for determining performance requirements of a communication protocol utilized by a host device;
means for comparing the determined performance requirements to available hardware resources of the data storage device;
means for selecting a memory die programming method and a memory die programming parameter based, at least in part, on the comparison of the determined performance requirements to the available hardware resources, the memory die programming method being selected from a plurality of memory die programming methods arranged in a programming method preference hierarchy; and
means for configuring the data storage device to perform one or more programming operations according to the at least one of the memory die programming method and the memory die programming parameter.

19. The data storage device of claim 18, further comprising means for storing configuration information of the data storage device.

20. The data storage device of claim 18, wherein the means for determining the performance requirements of the communication protocol associated with host device is operable to determine the performance requirements in response to a configuration event.

\*    \*    \*    \*    \*